United States Patent [19]
Fernandez et al.

[11] Patent Number: 5,812,530
[45] Date of Patent: Sep. 22, 1998

[54] NETWORK EMULATOR IN ASYNCHRONOUS TRANSFER MODE

[75] Inventors: Luis Merayo Fernandez; Ma Luisa Mola Morales; Ma Angeles Barbero Palomero; Carmen Cesar Vicente, all of Madrid, Spain

[73] Assignee: Telefonica De Espana, S.A., Madrid, Spain

[21] Appl. No.: 662,606

[22] Filed: Jun. 13, 1996

[30]     Foreign Application Priority Data

Aug. 11, 1995 [ES] Spain ................................ 9501649

[51] Int. Cl.⁶ ........................................... H04L 12/26
[52] U.S. Cl. ............................... 370/250; 370/395
[58] Field of Search .................... 370/253, 395, 370/904, 907

[56]        References Cited

U.S. PATENT DOCUMENTS 5,343,465  8/1994  Khalil ............................... 370/17
5,524,106  6/1996  Tremel et al. .................... 370/13

*Primary Examiner*—Chi H. Pham
*Assistant Examiner*—W. Todd Baker
*Attorney, Agent, or Firm*—Reid & Priest LLP

[57]        ABSTRACT

A network emulator in asynchronous transfer mode, consisting of emulating the performance of a digital network of integrated wideband services operating in asynchronous transfer mode, with no need to use said network, or else emulating intense operating conditions typical of a very loaded network on an unloaded network, having a line interface module (1), one or several central modules (2), a control module (3), and an operating module (4), having an electro-optical converter (9), a series/parallel converter in receiving, and a parallel/series converter in transmitting, as well as a network terminator (11), with asynchronous transfer mode, and a bit error rate generator, the central module (2) or modules being configured by a variable delay block (12), a cell error block (13), a cell loss block (14), an erroneous insertion block (15), and a constant delay block (16).

4 Claims, 1 Drawing Sheet

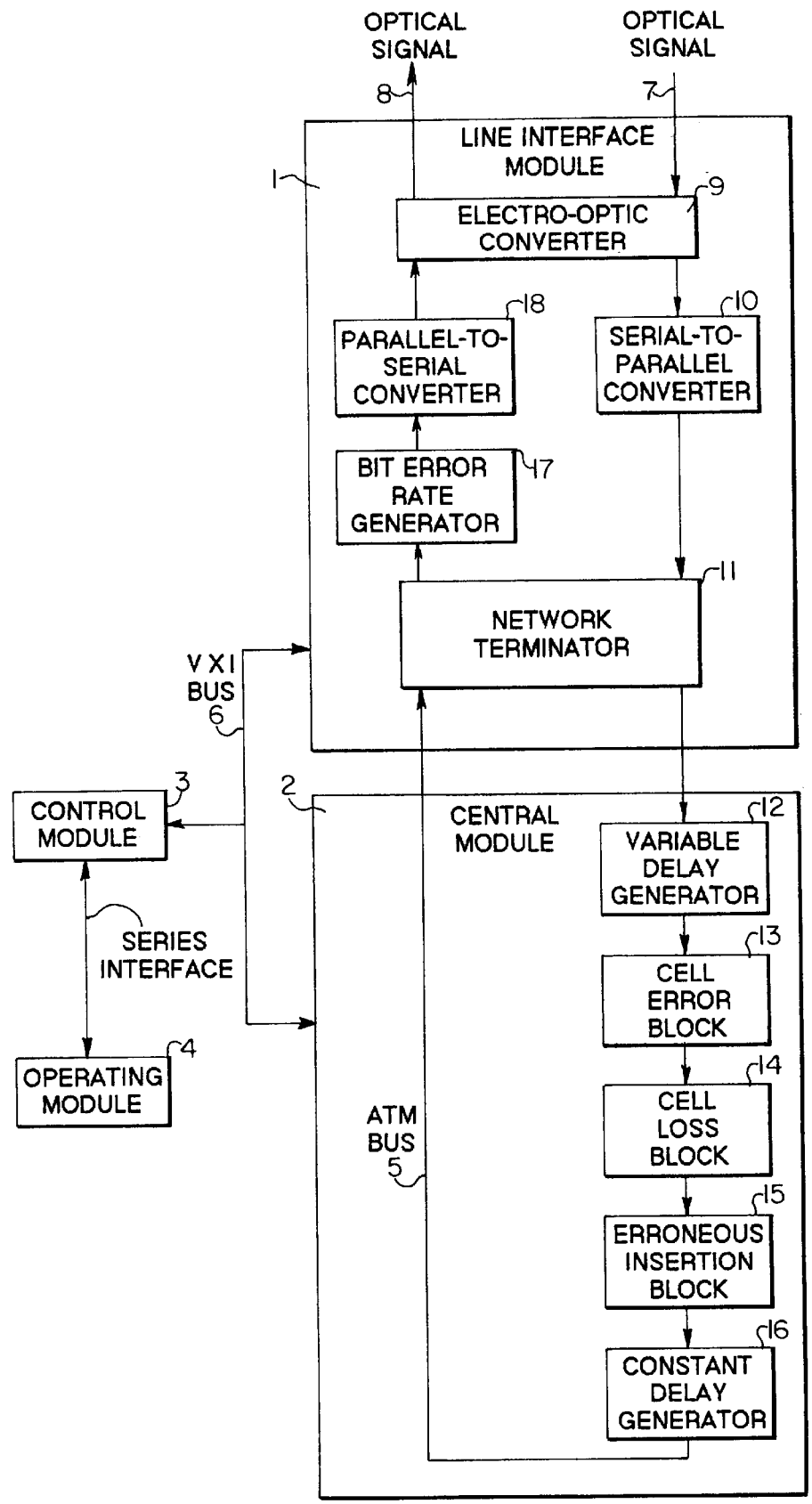

NETWORK EMULATOR IN ASYNCHRONOUS TRANSFER MODE

BACKGROUND OF THE INVENTION

The present specification refers to an application for a patent of invention related to a network emulator in asynchronous transfer mode, the purpose of which is to emulate the performance of a Digital Network of Integrated Wideband Services (DNIS) operating in Asynchronous Transfer Mode (ATM), there being no need to make use of said network, or else emulating intense operating conditions typical of a very loaded network on an unloaded network.

1. Field of the Invention

This invention has an application in the telecommunications field, and specifically in systems using a Wideband Asynchronous Transfer Mode.

2. Related Art

To emulate a digital network of integrated wideband services in asynchronous transfer mode means to control the basic parameters characterizing this type of networks:

Constant and variable cell delay,

Erroneous cell insertions,

Cell loss,

Cell and bit errors.

A few emulators are known, which only allow some of said parameters to be controlled, said control being performed in an individualized way and with a determinant character, which does not allow the real performance of a network of the mentioned type to be studied.

It would be desirable to rely on an emulator which could analyze, jointly, the above-mentioned basic parameters, by following a statistical performance pattern, which would allow for a real emulation of a network of this type.

Nevertheless, up till now, the applicant knows nothing about the existence of any equipment contemplating the characteristics pointed out as suitable for a network emulator in asynchronous transfer mode.

SUMMARY OF THE INVENTION

The network emulator in asynchronous transfer mode as proposed by the invention, constitutes per se an evident solution to the present problems on this matter, since itself displays all the advantages considered as suitable for verifying the performance of the adaptation layer to the asynchronous transfer mode and upper layers, when said digital network of integrated wideband services is not available, or else when being available is not sufficiently loaded.

In a more definite way, the network emulator in asynchronous transfer mode of the invention is constituted by a line interface module, one or several central modules, a control module, and an operating module, these latter modules, that is to say, the control module and the operating module, including a respective software for control and operation.

The different existing connections among the emulator modules are as follows, namely:

The line interface module, the central module, and the control module are interconnected by means of a VXI bus, which allows the control module to have an efficient access to the other two modules.

The connection between the line interface module and the control modules is carried out by means of an ATM, that is to say, an asynchronous transfer mode, which permits an ATM cell traffic.

The operating module communicates with the control module thru a series interface.

The line interface module (receiving and transmitting) of the Synchronous Digital Hierarchy (SDH), of type Synchrnous Transport Mode, Level 1 (STM-1), is responsible for the function associated with the physical layer, and emulates the effects of the errors in the transmission lines.

The receiving side performs adaptation functions (Synchronous Digital Hierarchy—Asynchronous Transfer Mode, SDH/ATM), as well as the conversion of a monomode or multimode optical signal into an electric signal.

The transmitting side performes supplementary functions, that is to say, the cell transport from the Asynchronous Transfer Mode in Synchronous Digital Hierarchy (SDH/STM-1) and the electric signal conversion into a monomode or multimode optical signal.

Before the electro-optical conversion, and in order to emulate the effects of the errors in the transmission lines, the correlations SDH/STM-1 can be affected by a bit error generator, controlled by the user.

This module is composed of four different blocks, namely:

An electro-optical converter. In receiving, it converts the optical signal caught thru an external interface into an electric signal, obtaining also a clock associated with the data. In transmitting, it performs an opposite function, converting the electric signal into an optical signal.

A series-parallel converter. In receiving, its function is to convert the received series data into parallel ones, performing an opposite function in transmitting.

Synchronous Digital Hierarchy—Asynchronous Transfer Mode, SDH/ATM, Termination. This block, which is based on the Network Terminator with Asynchronous Transfer Mode (NTA), (Spanish Patent No. 9502029), transports cells in asynchronous transfer mode ATM in C4 containers, of the SDH correlations, generates and detects the physical layer alarms of path/section, and provides statistical measurements of quality service associated with the SDH side and the ATM side.

Bit Error Rate (BER) generator. This block modifies the SDH correlations produced by the SDH/ATM Terminator (transmitting), by inserting bit errors which emulate the performance of the transmission lines.

Given that this type of errors usually happen in flashes, this block is capable of emulating this performance, by generating several consecutive bit errors on a determined byte.

The bit error rate to be applied is computed starting from two independent processes, the byte of the SDH correlation being selected firstly, to which the errors will be applied, for, then, selecting the number of erroneous bits and their position within the byte.

The selection of the erroneous byte (number of correct bytes between two consecutive erroneous bytes) is performed in accordance with the statistical function of sharing determined by the user, and the performance of which is carried out according to the Montecarlo method.

The central module or modules act on the ATM cells, emulating the basic parameters associated with the ATM layer, such as the constant and variable cell delay, erroneous insertions, losses and errors in ATM cells, all this in accordance with that specified by the user.

The central modules can be connected in series each other, so that the variation range of the parameters can be increased.

Also, these modules are connected to the line interface modules performing the physical layer functions.

The gap between the emulation functions associated with the physical layer (line interface module) of those other functions associated with the ATM layer (central module) allows the independence between layers to be maintained, so that it would be possible to support other physical layer by only developing the corresponding interface module, this change not affecting, by any means, the central modules.

The blocks constituting this module are as follows:

Variable delay. This block generates a variable delay in each of the data cells selected by the user (it does not affect the cells not assigned or empty, not even those of data not selected), representing the variable wait time in the queues of the network elements.

The value of the generated delay varies in accordance with a statistical function defined by the user, the achievement of which is carried out by means of a Markov chain.

Errors in cells. The function of this block is similar to that of the bit error rate (BER) generator incorporated in the line interface module. In this case, the difference between both is that the bit errors only affect the data area of the selected cells, and not their headers.

Given that this type of errors usually happen in flashes, this block is capable of emulating this performance by generating several consecutive errors on a determined byte. The bit error rate to be applied is computed starting from two independent processes: first, the byte of the selected cell to which the errors will be applied, is determined; then, selecting the erroneous bits (number and position in the byte).

The selection of the erroneos bits (number of correct bytes between two consecutive erroneos bytes of the data area of the selected cells) is made in accordance with the sharing function specified by the user, and the achievement of which is carried out according to the Montecarlo method.

Loss of cells. This block performs an aleatory replacement of cells asigned and selected by the user, by not assigned cells.

This replacement is carried out in accordance with an aleatory sharing function defined by the user, and emulates the effect of cell losses, both due to overflows in the queues and due to the existence of errors not corrected in the cell header (both detected and not detected).

Optionally, the replacement of cells lost by not assigned or empty cells can be changed by not empty cells with a predetermined headers.

Given that these losses happen to occur in flashes, this module can generate several consecutive losses.

The selection of the first cell to be lost (first in a possible flash) is carried out according to the share function specified by the user, and the achievement of which is carried out according to the Montecarlo method.

Erroneous insertions. The function of this block is the aleatory replacement of not assigned or empty cells, the content of which (header, two first and two last bytes of the data area) can be defined by the user.

This replacement is made according to an aleatory sharing function define by the user, and it emulates the effect of erroneous insertions provoked by errors not detected, and, consequently, not corrected, in the cell header. In this block no insertions in flashes are permitted, since said performance is extremely unusual.

The selection of a cell not assigned to be replaced by other assigned and predetermined is performed according to the sharing function specified by the user, and the achievement of which is carried out by the Montecarlo method.

Constant delay. This block emulates the constant delay entered both by transmitting means and by latency of the switching equipment in a determinated network configuration.

The assigned cells, candidate for undergoing the delay, can be selected by the user. In case of output difficulty among cells affected by a costant delay and cells not affected (not selected), the latter have priority, and the former will have a greater delay than that programmed.

The control module controls and configures the different interface modules and central modules constituting the emulator.

The main function of this module is the communication between the operating unit and the central and line interface modules with which the emulator is fitted.

To this end, it is provided with two different interfaces: RS232, which, together with an adequate protocol, communicates it with the operating module; and VXI, by means of which it controls and configures several central and line interface modules constituting the emulator.

Also, it includes a software allowing the operating module to communicate with different central modules or interfaces to achieve the programming tasks required by the user.

It is started from the operating unit by sending a command thru the series line, and basically it performs the following tasks;

To read request messages transmitted by the operating module,

To translate same into read and/or write commands from/to the XVI bus, and

To send answer messages to the operating module.

In case of a programming message from any module, the sequence of actions will depend on the type of module.

For modules in which the variation of parameters is performed following the Montecarlo method (insertions, losses and errors), the user may make use of two possibilities: to directly enter the values to be written in a memory of 4096 positions corresponding to the block to be programmed, or to choose between an assembly of predetermined functions (normal, exponential, uniform and deterministic), by entering parameters defining them.

The variable delay module, wherein the delay generation is performed according to a Markov process, offers also the user two possibilities: to directly enter the values of a change-of-state probabilities for all possible states, or to choose among several predetermined shares or distributions, which can be implemented thru Markov processes.

An additional software allows, by inserting an ATM traffic generator and an interval meter into the emulator, thru the programming of one of the registers of the central module, said output to signalize the occurrence of a determined event, such as the loss of a cell, the insertion of errors into a byte, the insertion of a cell, the input of a data cell into the module, the output of a data cell out of the module, and so on.

By measuring the time among the pulses of this signal with the interval meter, the really obtained distribution can be characterized.

Said software takes on the task of programming the interval meter in conformity with the block being tested and with what is expected to obtain, processing the data obtained and giving the user a measurement of the error made upon comparing the distribution or share to be expected with that really obtained, and drawing also jointly the graphics of both distributions.

The operating module is based on a personal computer which incorporates a man-machine interface, in addition to a RS232 interface to communicate with the control module.

It incorporates a software implementing the operating interface, allowing the user to accede to the functional characters of the equipment in an easy and friendly way.

It performs the user-operating module communication, and the operating module-control module communication.

It allows each of the blocks inserting a variation into the basic parameters of the emulated network to be programmed, hiding from not advanced users the details of the hardware fulfilment.

To this end, in addition to the possibility of entering the values to be written into the tables characterizing the distributions to be generated, it is feasible to select predetermined distribution functions which only need their statistical parameters to be fully defined.

Out of the additional facilities, an option on saving configurations to be easily used in later sessions is included.

The operating module-control module communication is performed by means of an owner protocol on a standard series RS232 interface.

Said protocol allows the operating module to send request messages for a module programming, or request messages for a state, as per the user's wishes, and to receive the corresponding answers.

DESCRIPTION OF THE DRAWING

In order to complement the present description and to aid to a better understanding of the characteristics of the invention, the appended drawing, which forms a part of this specification, shows, by way of illustrative and non-limiting example, the following only FIGURE:

The only FIGURE shows a general block diagram of the network emulator in asynchronous transfer mode, which is the object of the invention.

DETAILED DESCRIPTION OF THE PREFERRED EMBODIMENT

Following the only FIGURE, it can be seen that the network emulator in asynchronous transfer mode of the invention, is constituted starting from a line interface module (1), one or several central modules (2), a control module (3), and an operating module (4), the two latter including a corresponding control and operating software.

The different connections existing among the modules of the network emulator in asynchronous transfer mode are as follows, namely:

A line interface module (1), a central module (2), and a control module (3), which are interconnected one other by means of a VXI bus, so allowing the control module (3), the line interface module (1), and the central module (2) to have an efficient access.

The connection between the line interface module (1) and the central modules (2) is performed by means of a dedicated ATM bus which allows for the ATM cell traffic.

The operating module (4) communicates with the control module (3) thru a series interface.

The line interface module (1) (receiving and transmitting) of the Synchronous Digital Hierarchy (SDH), of type Synchronous Transport Mode of Level 1 (STM-1), is responsible for the functions associated with the physical layer, and emulates the effects of the errors on the transmission lines.

This module is composed of four different blocks, namely:

An electro-optical converter (9). In receiving, it converts the optical signal (7), caught thru an external interface, into an electrical signal, obtaining also a clock associated with the data. In transmitting, it performs an opposite function, converting the electric signal into an optical signal (8).

A series-parallel converter. In receiving (10), its function is to convert the series data received into 8 parallel bits, the opposite function being performed in transmitting (18).

SDH/ATM termination (11). This blocks transports ATM cells in C4 containers of SDH correlations, generates and detects the physical layer alarms of path/section, and provides statistical measurements of quality service, associated both with the SDH side and the ATM side.

Bit Error Rate (BER) generator (17). This block modifies the SDH correlations caused by the SDH/ATM terminator (transmitter), by entering bit errors emulating the performance of the transmission lines.

According to the Montecarlo method, the user writes in a memory of 4096 positions the values of the samples of the distribution function (number of correct bytes between to consecutive erroneous ones) to be emulated.

This memory is acceded, in an aleatory way, by means of a pseudoaleatory generator providing access addresses to the memory at the appropriate moments, so obtaining the value previously stored in same. This value is loaded in a count-down meter which decreases with each byte. The zero reading at the meter indicates the byte to be modified.

The selection both of the number of consecutive erroneous bits and of their position in the byte is statistically independent of the erroneous byte selection.

The position of the first erroneous bit is selected according to an even distribution between 1 and 8, while the number of erroneous bits (between 1 and 4) is selected according to the probability defined by the user, this probability being stored in dedicated registers the access to which is aleatory.

The errors made by this module affect only the outputting data flow. The emulator does not perform any discrimination to this end, since these errors might be made by any byte of the SDH/STM-1correlation, for which reason, the erroneous bits can indistinctly affect any zone of said correlation.

The central module (2) acts on the ATM cells, emulating the basic parameters associated with the ATM layer, such as the constant and variable delay, erroneous insertions, losses and errors in ATM cells; all this according to that specified by the user.

The blocks constituting this module are:

Variable delay (12). This block generates a variable delay in each of the cells of data selected by the user (not affecting those cells not assigned or empty, or the cells of data not selected), representing the variable wait time in the queues of the network elements.

The value of the generated delay varies according to a statistical function defined by the user, the performance of which is carried out by a Markov chain of 1024 states (numbered from 0 to 1023) of the birth and death type.

The cells selected by the user undergo a variable delay same as the state in which the Markov chain stands (variable delays between 0 and 1023 time the cell duration), said chain remaining in the same previous state. The cells not assigned or empty, or those cells of data not selected by the user, will not be affected by a variable delay, and will allow for changes of state in the Markov chain according to the probabilies selected by the user.

The practical achievement of the Markov chain is carried out by means of four memories of 1024 positions, each of which is associated with the 1024 states of the chain.

In the first memory for each state, the probability of change Pc(i) from the state (i) to the preceding state (i−1) or the next state (i+1) is stated, having arrived at the current state (i) from (i−1), while in the second memory, with the same condition of having arrived at the current state (i) from (i−1) for each state, the probability of passing to the predecing state P(i,i−1) is stated.

The third and fourth memories are exactly same as the preceding ones, but associated with the transition to the current state (i) from (i−1).

Whenever a cell not assigned or not selected by the user arrives, Pc(i) is compared with the value provided by a pseudoaleatory generator (in order to facilitate this comparison, the values written in the memory are Pc(i) and P(i,i+1), multiplied by the maximum number the pseudoaleatory generator is capable of producing).

If Pc(i) is lower that the generated number, the state does not change; otherwise, it is necessary to decide whether the change is to be made to the preceding state (i−1) or to the next state (i+1), depending on the issue of the comparison between a second pseudoaleatory value and the value P(i, i−1).

Errors in cells (13). The effect of this block is similar to the bit error rate (BER) generator (17), incorporated in the line interface module (1)

The difference between both is that, in this case, the bit errors only affect the area of data of the selected cells, and not the entire cell.

The selection of possibly affected cells is carried out by specifying the value of their header, each bit could be defined as "0", "1", or "disregard".

According to the Montecarlo method, the user writes in the memory of 4096 positions, the values of the distribution function samples (number of correct bytes between two consecutive erroneous ones) to be emulated.

This memory is aleatorily acceded (a pseudoaleatory generator provides access addresses to the memory at the adequate moments), the previously stored value thereof being obtained, this value being loaded in a countdown meter which decreases with each byte of the data area of the selected cells. The zero reading at the meter shows the byte to be modified.

The selection both of the number of consecutive erroneous bits and their position in the byte is statistically independent of the selection of the erroneous byte.

The position of the first erroneous bit is selected according to an even distribution between 1 and 8, while the number of erroneous bits (between 1 and 4) is selected in accordance with the probability defined by the user, this probability being stored in dedicated registers the access to which is aleatory.

Loss of cells (14). The effect of this block is the aleatory replacement of cells assigned and selected by the user, by cells not assigned or by cells specified.

The selection of the cells presumably affected is carried out by specifying their header value, each bit could be defined as "0", "1", or "disregard".

According to the Montecarlo method, the user writes in a memory of 4096 positions, the values of the distribution function samples (number of cells the header of which will coincide with the predetermined value selected by the user between the start of two continuous flashes of losses) to be emulated.

This memory is aleatorily acceded (a pseudoaleatory generator provides access addresses to the memory at the adequate moments), the previously stored value in the memory being obtained, this value being loaded in a countdown meter which decreases with each cell the header of which will coincide with the value selected. The zero reading at the meter indicates that the next cell must be the start of a flash of losses.

The selection of the number of consecutive losses (flash duration) is statistically independent of the first cell to be lossed.

This selection is carried out according to the probability defined by the user, this probability being stored in dedicated registers the access to which is aleatory.

Erroneous insertions (15). The effect of this block is the aleatory replacement of cells not assigned or empty, by assigned cells, the content of which (header, two first and two last bytes of the data area) can be defined by the user.

According to the Montecarlo method, the user writes in a memory of 4096 positions the values of the distribution function samples (number of cells not assigned between two consecutive erroneous insertions) to emulate.

This memory is aleatorily acceded (a pseudoaleatory generator provides access addresses to the memory at the adequate moment), the previously stored value in same being obtained, this value being loaded in a countdown meter which decreases with each cell not assigned. The zero reading at the meter indicates that the next cell not assigned will be replaced by the predetermined one.

Constant delay (16). This block emulates the constant delay introduced both by transmission means and by latency of the switching equipment in a determined network configuration.

This delay is deterministic and programmable, and it can vary between 0 and 19784 intervals of duration time of cell to 155,52 Mb/s.

The selection of cells probably to be affected is carried out by specifying the header value of same; each bit could be defined as "0", "1", or "disregard".

The control module (3) controls and configures several interface modules (1) and the central module or modules (2), as the case may be, constituting the emulator.

For those modules in which the parameter variation is performed according to the Montecarlo method (insertions, losses and errors), two possibilities are open to the user: to directly enter the values to be written in a memory of 4096 positions corresponding to the block to be programmed, or to choose among an assembly of predetermined functions (normal, exponential, uniform, and deterministic), by introducing parameters defining them.

In this later case, this software takes on the task of computing the 4096 values to be written in the memory, as follows: starting from the function of distribution F(x) (probability that the aleatory variable in question takes a value lower or equal than x), the axis y is divided among 0 and 1 in 4096 equal segments, and their mean points yi are taken; the 4096 values to be written in the memory are the values Xi, resultant from resolving the equations yi=F(xi).

Once the 4096 values have been obtained, both whether these have been directly entered by the user and have been computed by the program, they transform into the units required to be written in the memory (in case the values are given in rates instead of cells/bytes among events), and they are rounded off to the nearest positive integer value within the adequate range of the block in question.

The variable delay module, wherein the delay generation is performed following a Markov process, offers also the user two possibilities, namely: to directly enter the values of the change-of-state probabilities Pc(i) and P(i,i−1) for all possible states, or to choose among several predetermined distributions, which can be implemented through Markov processes.

These distributions are geometric, binomial, exponential, and normal.

The exponential and normal distributions are treated as geometric and binomial ones, respectively, since, under certain conditions, the latter are discrete approaches to the former.

As regards these distributions, the user only is to enter the statistical parameters characterizing them (mean or mean and variant), the software computing the values of the probabilities Pc(i) and P(i,i−1) through intermediate values Ti and UI, which are calculated as follows:

Geometric distribution. Given the mean of the distribution, firstly a change of units is carried out in case the mean delay is specified in time units instead of cells. Considering the new value obtained as X, the Markov chain implementing said geometric distribution has infinite states, and it is defined by the following birth and death rates: Ti=X, Ui=X+1.

Since in the variable delay module, a maximum length of the Markov chain of 1024 has been imposed, every state of a value higher that 1023 approaches to this state (P(state=1023)=Pbinomial (state≧1023), its death rate being modified according to said relationship.

Binomial distribution. Given the mean and the variant, firstly a change of units is carried out, as described for the preceding case. Then, the parameters n, p, q, which are characteristics in every binomial distribution, are calculated. For it, an algorithm maintaining the mean entered and trying that the process variant will be the most approached to that expected, is follows.

Lastly, the probabilities are calculated following the already described formulae, are multiplied by 65535 and are rounded off, obtaining the values to be written in the tables.

The operating module (4) is based on a personal computer incorporating a man-machine interface, in addition to a RS232 interface for communicating with the control module.

It is not considered necessary to extend this description for any expert in the art to understand the scope of the invention and the advantages derived from it.

The materials, shape, size and arrangement of the components will be open to variation, provided that it does not imply any alteration to the essence of the invention.

The terms under which this specification has been described should be always taken in an ample and non-limitative sense.

We claim:

1. An asynchronous transfer mode (ATM) network emulator, comprising:

a) a line interface module for operating with Synchronous Digital Hierarchy (SDH), Synchronous Transport Module (STM) Level One, the line interface module including:
1) an electro-optical converter for converting input optical signals that are received by the line interface module into first electrical signals, and for converting second electrical signals into output optical signals for output from the line interface module;
2) a series-to-parallel converter for converting the first electrical signals into parallel signals;
3) a network terminator that receives the first electrical signals, and that communicates via an ATM bus;
4) a bit error rate generator, responsive to the network terminator; and
5) a parallel-to-serial converter that converts an output of the bit error rate generator into the second electrical signals;

b) at least one central module, including, in combination:
1) a variable-delay generator;
2) a cell error block;
3) a cell loss block;
4) an erroneous insertion block; and
5) a constant-delay generator;

c) a control module that controls and configures the variable-delay generator, the cell error block, the cell loss block, the erroneous insertion block, and the constant-delay generator;

d) an operating module, with a human-machine interface, to which the control module is responsive in the control module's controlling and configuration;

e) a VXI bus connecting the line interface module, the at least one central module, and the control module;

f) a dedicated ATM bus connecting the line interface module and the at least one central module; and g) a serial interface connecting the control module and the operating module.

2. The ATM network emulator of claim 1, wherein:
the line interface module constitutes means for terminating the SDH physical layer and the ATM layer; and
bit error rate generator constitutes means for generating bit errors in accordance with a user-defined distribution function that is implemented with a Montecarlo method.

3. The ATM network emulator of claim 1, wherein
1) the variable-delay generator varies a variable delay parameters in accordance with a user-defined function distribution function that is implemented with statistical methods of Markov chains;
2) the cell error block varies a cell error parameter in accordance with a user-defined function distribution function that is implemented with the Montecarlo method;
3) the cell loss block varies a cell loss parameter in accordance with a user-defined function distribution function that is implemented with the Montecarlo method;
4) the erroneous insertion block varies an insertion parameter in accordance with a user-defined function distribution function that is implemented with the Montecarlo method; and
5) the variable-delay generator, the cell error block, the cell loss block, and the erroneous insertion block are connected in series so as to increase a range of variation of the parameters.

4. The ATM network emulator of claim 1, wherein the control module and the operating module include:
software that generates tables of statistical distribution and that allows a user to define distribution functions by which operation of the variable-delay generator, of the cell error block, of the cell loss block, and of the erroneous insertion block, is governed.

* * * * *